Feb. 12, 1929.
J. G. VINCENT
1,701,597
VIBRATION DAMPER FOR INTERNAL COMBUSTION ENGINES
Filed Jan. 10, 1928
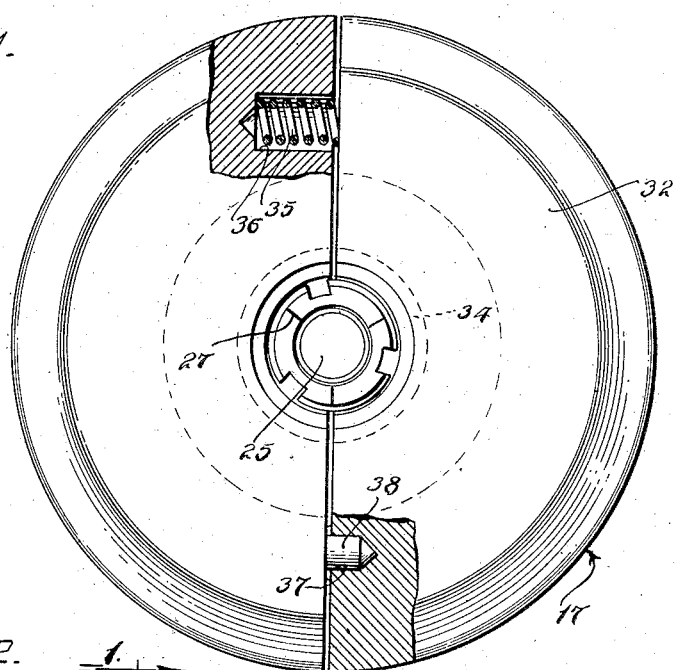
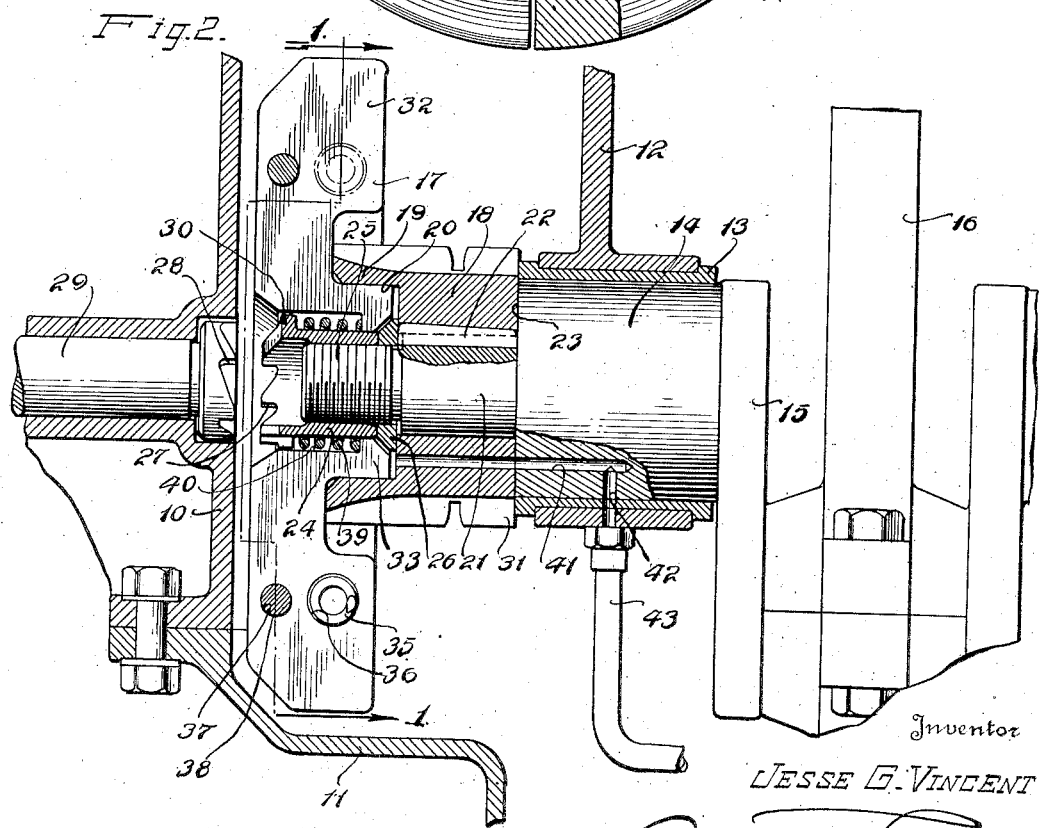
Inventor
JESSE G. VINCENT
By Milton Tibbetts
Attorney Patented Feb. 12, 1929.

1,701,597

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

VIBRATION DAMPER FOR INTERNAL-COMBUSTION ENGINES.

Application filed January 10, 1928. Serial No. 245,685.

This invention relates to internal combustion engines and particularly to means for controlling torsional vibration in shafts of such engines.

It has for one of its objects to provide a simple and effective device adapted to frictionally damp torsional vibration in an engine shaft.

Another object of the invention is to provide a vibration damper for shafts in which the frictional dissipation of energy is entirely effected between an expansible inertia member and its journal bearing.

Another object of the invention is to provide a vibration damper for shafts having a minimum of lost motion in the mounting of its relatively rotatable members.

Another object of the invention is to provide a vibration damper for shafts having simple and efficient means for initially expanding an inertia member into frictional engagement with a shaft member.

Another object of the invention is to provide a vibration damper for shafts which shall operate with a minimum of rattle and other noise.

A further object of the invention is to provide simple and effective means for securing an expanding inertia member in axial positon with respect to the shaft, so that it may be readily removed for any reason as desired.

Other objects of the invention will appear from the following description taken in connection with the drawing, which forms a part of this specification, and in which:

Fig. 1 is an end elevation of an engine shaft provided with a vibration damper constructed in accordance with this invention, partially in section substantially on the line 1—1 of Fig. 2, and Fig. 2 is a vertical, longitudinal section through a portion of an internal combustion engine having a vibration damper such as is shown in Fig. 1.

Referring to the drawings, 10 represents the crank case of an internal combustion engine, having a removable lower cover or oil pan 11 and provided with transverse webs such as shown at 12. These webs support suitable aligned bearings 13 for an engine crank shaft 14, which has the usual integral cranks 15, each of which is connected by a connecting rod 16 to a piston mounted in one of the engine cylinders. The piston and cylinders are not shown in the drawing, but are of usual construction.

The damping means of this invention is illustrated in Fig. 2 as mounted at or adjacent the end of the crank shaft 14. It is in the form of a sectional inertia member 17, mounted coaxially with the crank shaft in a suitable bearing part thereof. As shown, this bearing part is a shaft member 18 having a forwardly projecting portion 19 in which is formed an axially disposed bore, forming a journal bearing 20. The shaft member 18 is keyed to the reduced end 21 of the crank shaft, as indicated at 22.

One end of the member 18 preferably abuts a shoulder 23 formed by reducing the end of the crank shaft, and it is retained in axial position by a nut 24 on the threaded end 25 of the shaft. This nut operates through a washer 26 against the inner radial face of the bore, and also against the end of key 22, so that the member 18 is rigidly secured to the crank shaft to rotate therewith. The inertia member, however, is free to turn in the bearing 20 except as hereinafter described.

The end of the nut 24 is preferably formed with clutch teeth 27 which may be engaged with similar teeth 28 on an endwise movable starter shaft 29. This is the usual hand starting crank for manually rotating the crank shaft for starting. The nut 24 is also formed with a flange 30 near its outer end, the purpose of which will hereinafter appear. A gear or chain sprocket 31 may be formed on the shaft member 18, if desired, and used for driving the engine camshaft and other engine accessories (not shown).

The inertia member 17 is in the form of an annulus or ring composed of segmental weight members 32 of substantially equal mass. There are preferably two of these segments or weight members 32, which are accordingly semi-cylindrical in contour, and each of these is formed with an axially projecting bearing portion 33, which portions taken together form a hub or trunnion 34 journaled in the bearing 20 of the member 18. This trunnion 34 is of sufficient length to properly support the inertia member in axial alignment with the crank shaft 14 and the shaft member 18, and the bearing 20 serves not only as a support for the inertia member, but also as retaining means to limit or prevent radial movement of the segmental sections 32, or expansion of the inertia member, under the action of centrifugal force.

The trunnion 34 is also expansible with the inertia member 17, the bearing portions 33 thereof being respectively integral with the weight members 32, so that considerable friction is developed at the bearing 20, which increases with the speed of the shaft as the pressure due to centrifugal force increases. This bearing friction constitutes the damping friction of the device, and dissipates energy from the rotating system in the form of heat, the energy being subtracted from the energy of vibration so as to prevent the resonant growth thereof at the critical speeds, as is well understood in the art to which this invention relates.

Means are also provided to increase the bearing friction by any desired amount. In the form shown this comprises symmetrically disposed springs 35, each seated in a recess formed in one of the members 32 and bearing at its free end against the adjacent face of the companion weight member. These springs serve to urge the weight members apart thus providing a light initial pressure of the members 33 against the bearing 20, whereby starting friction for the inertia member is provided, and the operating friction is increased by a constant amount.

The members 32 are also preferably formed with recesses 37, in which are secured plugs 38 of fibre or other suitable sound deadening material, which plugs project slightly from their respective bores and engage the opposite weight member to prevent metallic contact of these members. In this way rattle and other noises caused by striking together of the segmental weight members during operation of the damper is avoided.

The inertia member 17 is retained axially in position on its bearing 20 by means of a spring 39, seated in a recess 40 formed coaxially with the inertia member 17 and bearing at its outer end against the flange 30 previously described. In this manner the rearwardly disposed face of the inertia member 17 is resiliently retained in engagement with the end of the projecting portion 19 of the shaft member 18.

The operation of the device will be apparent from the above description. When the crank shaft 14 is started, the initial friction between the members 33 and the journal bearing 20, caused by the pressure of the springs 35, is sufficient to start the inertia member rotating. The contact pressure increases as the speed increases by reason of the centrifugal force acting on the weight members 32, which causes a very slight increase in the effective diameter of the trunnion, as much as is permitted by the clearance in the bearing 20. This expansion against the bearing produces a braking effect which resists forces tending to move the inertia member relatively to the shaft member, and retards any such relative movement.

As is well understood, torsional vibration in the shaft tends to cause a rapid, alternating relative movement between the member 18 which is fixed to the shaft, and the inertia member 17, and the frictional resistance to such relative movement is well adapted to dissipate the energy of such vibrations. The centrifugal force, and of course the friction, increases with the shaft speed, which results in heavier damping for the greater vibratory energy at the higher shaft speeds.

The inertia member 17 may be conveniently constructed by forging or casting a disk-shaped member of the desired form and then sawing it into equal halves on a diameter, these halves being subsequently drilled to provide the recesses 36 and 37 for the friction springs 35 and for the sound deadening plugs 38 respectively.

A metered supply of lubricant for the bearing 20 may be provided from the pressure oiling system of the engine if desired. For this purpose a passage 41 is provided in the crank shaft communicating by a metering port 42 with the lubrication system 43 at the nearest crank shaft bearing 13. This passage 41 communicates at its other end with the interior of the bore in the end of the member 18, from which it is distributed to the surface of the bearing 20. A metered charge of oil is supplied to the passage 41 at every revolution of the crank shaft 14, and it will be apparent that by properly choosing the size of the metering port 42, any desired amount of lubrication may be supplied to the bearing 20.

From the foregoing description it will be apparent that this invention provides a simple and effective vibration damper, in which the damping friction occurs entirely in the journal bearing 20, thus dispensing with much of the expansive machining to close limits requiring when the braking takes place between the outer rim of the inertia member and a friction member or drum. At the same time the keyed connection between a friction drum and the shaft members is eliminated, thus further reducing the chance for the occurrence of lost motion in the mounting, which lost motion is fatal to damper operation. Moreover, by reason of the plugs 38, direct contact of the weight members 32 is prevented, thus providing a damper free from noise at all engine speeds.

By varying the size of the lubricating port 42, any desired amount of lubricant may be provided for the bearing 20, and as the initial load on this bearing may be readily determined by the size of the springs 35, any desired amount of damping friction may be secured without danger of injury to the bearing surface.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. A vibration damper for shafts comprising a bearing member at the end of the shaft having an axially disposed bore, an inertia member having segments with lateral projections forming a trunnion disposed in said bore, means tending to radially separate the segments to expand the inertia member and means to retain the trunnion portion axially within said bearing bore.

2. A vibration damper for shafts comprising a member secured to the end of the shaft having an axially disposed bore forming a bearing, a pair of segmental weight members forming an inertia member, each segment having an axially disposed portion which portions cooperate to form a trunnion rotatably mounted in said bore, spring means between the weight members operable to increase the bearing pressure between the trunnion and the bore, and means on the shaft to axially retain the inertia member in position.

3. A vibration damper for shafts comprising a rotatable inertia member having a pair of semi-cylindrical weight portions, an axially extending bearing portion on each weight member together forming an expansible trunnion for the inertia member, and a member secured to the shaft having an axially disposed bearing portion in which said trunnion is journaled.

4. A vibration damper for shafts comprising a hollow bearing member coaxially secured to the shaft, a pair of semi-cylindrical weight members forming an annular inertia member, each weight member having a projecting portion, which portions form an axially disposed hollow trunnion for the inertia member rotatably journaled in said bearing member, a retaining member on the shaft within said hollow trunnion, and spring means engaging the retaining member adapted to hold the inertia member in axial position on the shaft.

5. A vibration damper for engine shafts comprising symmetrically disposed segmental weight members forming a rotatable inertia member, each said weight member inertia member, having a projecting bearing portion which portions form a projecting hub for the inertia member, means urging said weight members and said hub portions radially apart, and a bearing member secured to the shaft in which said hub is journaled, said member frictionally retarding relative rotation of the inertia member upon expansion of the weight members.

6. A vibration damper comprising a radially expansible inertia member having a projecting bearing portion, and a member on the shaft in which the projecting bearing portion is journaled, said shaft member limiting the expansion of the inertia member and frictionally resisting relative rotation thereof with respect to the shaft.

7. A vibration damper comprising a radially expansible inertia member having cooperating weight portions and a journal portion, springs between the said weight portions urging the inertia member into expanded position, means between said weight portions to prevent contact thereof, and a bearing member for the journal portion secured to said shaft.

8. A vibration damper for engine shafts comprising a bearing member rotatable with the shaft, and a sectional inertia member having an expansible trunnion journaled in said bearing member.

9. A vibration damper for engine shafts comprising a bearing member rotatable with the shaft, and a two-part inertia member having a trunnion expansible in response to centrifugal force on the parts of the inertia member, journaled in and frictionally engaging said bearing, and means including a spring axially retaining the inertia member in the bearing.

10. A vibration damper for engine shafts comprising segmental inertia members frictionally mounted to rotate with respect to said shaft, said segments having recesses in the adjacent faces thereof, means in some of said recesses to separate the segments and means in other of said recesses to prevent direct contact of the segments.

In testimony whereof I affix my signature.

JESSE G. VINCENT.